United States Patent
Sasao et al.

(10) Patent No.: US 10,415,636 B2
(45) Date of Patent: Sep. 17, 2019

(54) BEARING WITH WIRELESS SENSOR

(71) Applicant: NSK Ltd., Shinagawa-ku, Tokyo (JP)

(72) Inventors: Kunihiko Sasao, Fujisawa (JP); Nobuko Okutani, Fujisawa (JP)

(73) Assignee: NSK Ltd., Tokyo (JP)

( * ) Notice: Subject to any disclaimer, the term of this patent is extended or adjusted under 35 U.S.C. 154(b) by 147 days.

(21) Appl. No.: 15/543,820

(22) PCT Filed: Jan. 12, 2016

(86) PCT No.: PCT/JP2016/000123
§ 371 (c)(1),
(2) Date: Jul. 14, 2017

(87) PCT Pub. No.: WO2016/114129
PCT Pub. Date: Jul. 21, 2016

(65) Prior Publication Data
US 2018/0038414 A1 Feb. 8, 2018

(30) Foreign Application Priority Data
Jan. 15, 2015 (JP) .............................. JP2015-005729

(51) Int. Cl.
*F16C 19/52* (2006.01)
*F16C 41/00* (2006.01)
(Continued)

(52) U.S. Cl.
CPC ............ *F16C 19/527* (2013.01); *F16C 19/52* (2013.01); *F16C 41/00* (2013.01); *F16C 41/008* (2013.01);
(Continued)

(58) Field of Classification Search
CPC ........ F16C 19/527; F16C 19/52; F16C 41/00; F16C 41/008; F16C 41/045; G01M 13/04;
(Continued)

(56) References Cited

U.S. PATENT DOCUMENTS 8,823,505 B2 * 9/2014 Maekawa ........... B60C 23/0408
340/442
2002/0054719 A1 5/2002 Takizawa et al.
(Continued)

FOREIGN PATENT DOCUMENTS

JP 2003-42151 A 2/2003
JP 2003-58976 A 2/2003
(Continued)

OTHER PUBLICATIONS

International Search Report (PCT/ISA/210) issued in PCT Application No. PCT/JP2016/000123 dated Apr. 19, 2016 with English translation (five pages).
(Continued)

*Primary Examiner* — Nicholas Kiswanto
(74) *Attorney, Agent, or Firm* — Crowell & Moring LLP

(57) ABSTRACT

For the purpose, a physical quantity regarding a bearing body is detected by a detection sensor provided in the bearing body, and detection information of the detection sensor is transmitted by a wireless transmitting unit provided in the bearing body via wireless communication. At this time, the detection information is transmitted at a first transmission interval when the detection information is smaller than a threshold value and is a normal value, and the detection information is transmitted at a second transmission interval that is shorter than the first transmission interval when the detection information is the threshold value or larger and is an abnormal value.

10 Claims, 4 Drawing Sheets

(51) Int. Cl.
*G08C 17/00* (2006.01)
*F16C 41/04* (2006.01)
*G08C 17/04* (2006.01)
*G01P 21/02* (2006.01)
*G01M 13/04* (2019.01)
*G01M 13/045* (2019.01)

(52) U.S. Cl.
CPC ........... *F16C 41/045* (2013.01); *G01M 13/04* (2013.01); *G01M 13/045* (2013.01); *G01P 21/02* (2013.01); *G08C 17/00* (2013.01); *G08C 17/04* (2013.01); *H04Q 2209/823* (2013.01)

(58) Field of Classification Search
CPC ...... G01M 13/045; G01P 21/02; G08C 17/00; G08C 17/04; H04Q 2209/823
See application file for complete search history.

(56) References Cited

U.S. PATENT DOCUMENTS

| | | |
|---|---|---|
| 2003/0030565 A1 | 2/2003 | Sakatani et al. |
| 2005/0259903 A1 | 11/2005 | Takizawa et al. |
| 2006/0052920 A1 | 3/2006 | Watabe |
| 2006/0145881 A1 | 7/2006 | Sakatani et al. |
| 2011/0246101 A1 | 10/2011 | Araki et al. |
| 2012/0293115 A1 | 11/2012 | Ramsesh |
| 2013/0060417 A1 | 3/2013 | Oriet et al. |
| 2015/0048952 A1 | 2/2015 | Murphy |

FOREIGN PATENT DOCUMENTS

| | | |
|---|---|---|
| JP | 2005-100164 A | 4/2005 |
| JP | 2005-141439 A | 6/2005 |
| JP | 2006-69413 A | 3/2006 |
| WO | WO 2010/067715 A1 | 6/2010 |
| WO | WO 2013/096254 A1 | 6/2013 |

OTHER PUBLICATIONS

Japanese-language Written Opinion (PCT/ISA/237) issued in PCT Application No. PCT/JP2016/000123 dated Apr. 19, 2016 (four pages).

Extended European Search Report issued in counterpart European Application No. 16737200.2 dated Jan. 8, 2018 (11 pages).

International Preliminary Report on Patentability (PCT/IB/338 & PCT/IB/373) issued in PCT Application No. PCT/JP2016/000123 dated Jul. 18, 2017, including English translation of document C2 (Japanese-language Written Opinion (PCT/ISA/237)) previously filed on Jul. 14, 2017 (seven pages).

* cited by examiner

BEARING WITH WIRELESS SENSOR

TECHNICAL FIELD

The present invention relates to a bearing with a wireless sensor.

BACKGROUND ART

A bearing with a wireless sensor, which detects various physical quantities, such as a temperature around the bearing, with the wireless sensor, and transmits detection information to a receiving-side device, such as a higher-level device, is proposed (for example, refer to PTL 1 and PTL 2).

CITATION LIST

Patent Literature

PTL 1: JP 2003-58976 A
PTL 2: JP 2003-42151 A

SUMMARY OF INVENTION

Technical Problem

In the above-described bearing with a wireless sensor, the detection information is transmitted when various pieces of detection information by the wireless sensor exceed a threshold value, and is transmitted to the receiving-side device at a preset regular interval.

In the foregoing receiving-side device, in order to detect an abnormality of the detection information at an earlier stage, the threshold value must be set to be low, or the transmission interval must be set to a relatively short interval. Setting the threshold value to be low and shortening the transmission interval of the detection information lead to an increase in processing load in a transmitting-side device of the detection information and the receiving-side device of the detection information. Thus, a method by which the increase in processing load can be suppressed and an abnormality of the detection information can be detected appropriately at an earlier stage has been desired.

Solution to Problem

According to an aspect of the present invention, there is provided a bearing with a wireless sensor, the bearing including: a bearing body; a detection sensor that is provided in the bearing body and configured to detect a physical quantity regarding the bearing body; a transmission processing unit that is provided in the bearing body and configured to transmit detection information by the detection sensor via wireless communication; a signal processing unit that is provided in the bearing body and configured to control a transmission interval of the detection information by the transmission processing unit; and a power generation unit that is provided in the bearing body and configured to provide electric power to the detection sensor, the transmission processing unit, and the signal processing unit. The signal processing unit is configured to make the transmission interval shorter as the detection information has a larger value in an abnormal value direction, the abnormal value direction being a direction of the detection information from a normal value side toward an abnormal value side.

Advantageous Effects of Invention

According to an aspect of the present invention, an abnormality of detection information by a detection sensor can be recognized more quickly in a receiving-side device of the detection information. Thus, the abnormality of the detection information can be addressed more quickly, and long-term safe usage of a bearing body can be achieved.

DESCRIPTION OF EMBODIMENTS

Hereinafter, embodiments of the present invention will be described with reference to the drawings.

In the following detailed description, a number of specific details will be described for providing complete understanding of the embodiments of the present invention. However, it is clear that one or more embodiments are practicable without such specific details. In addition, well-known structures and devices are illustrated by schematic diagrams for simplifying the drawings.

First, a first embodiment of the present invention will be described.

Figure 1A:
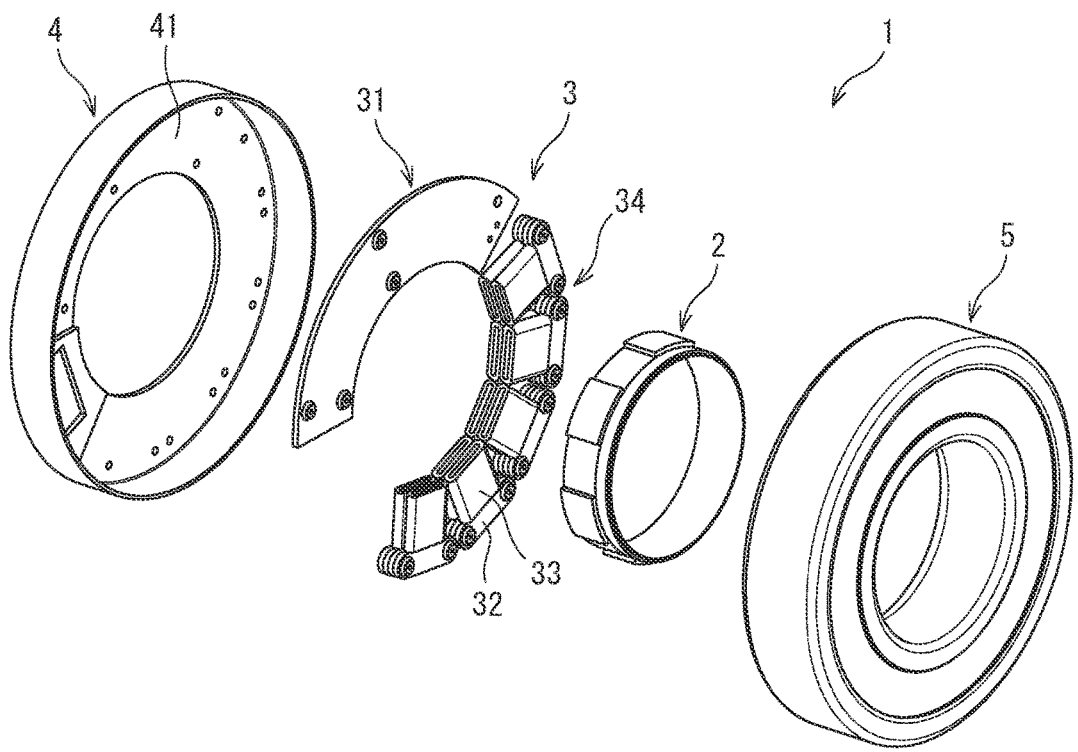
FIG. 1A is an exploded perspective view illustrating one example of a bearing with a wireless sensor in an embodiment of the present invention.
Figure 1B:
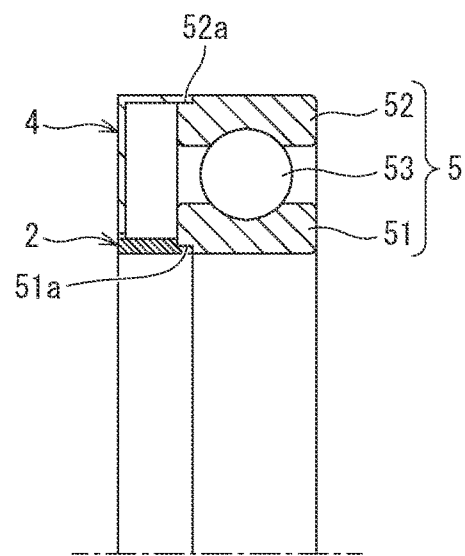
FIG. 1B is a configuration diagram illustrating main parts of a bearing body.

FIG. 1A is an exploded perspective view illustrating one example of a bearing 1 with a wireless sensor in an embodiment of the present invention, and FIG. 1B is a configuration diagram illustrating main parts of a bearing body.

Here, the case where a wireless sensor is incorporated into a rolling bearing will be described, but the wireless sensor can be incorporated into a sliding bearing.

As illustrated in FIG. 1A and FIG. 1B, the bearing 1 with a wireless sensor includes a tone ring 2, a sensor unit 3, a cover 4, and a bearing body 5.

Grooves 51a and 52a are respectively formed on an end surface on the inner peripheral side of an inner ring 51 and an end surface on the outer peripheral side of an outer ring 52 of the bearing body 5. The groove 51a of the end surface on the inner peripheral side of the inner ring 51 allows the cylindrical tone ring 2 to be attached thereto, and the groove 52a of the end surface on the outer peripheral side of the outer ring 52 allows the cover 4 to be provided therein.

Periodic bumps and dents are formed on the outer periphery of the tone ring 2.

The sensor unit 3 includes a sensor substrate 31 on which a detection sensor, a wireless transmitting unit, and the like described below are mounted, and a coil unit 34 in which a plurality of coils 33 each of which is obtained by winding a conductive wire around a yoke 32 formed of a magnetic material is arranged. The sensor substrate 31 and the coil unit 34 are formed into an arc shape so as to form a part of a circular ring.

The tone ring 2 is arranged in the hollow part of the sensor unit 3, and is arranged such that the bumps and dents on the outer periphery of the tone ring 2 are opposed to the coils 33 of the sensor unit 3.

The cover 4 is formed into a cylindrical shape, one surface of the cylinder is opened, and the other surface is formed into a circular ring shape to form an attaching surface 41 of the sensor unit 3. The cover 4 on the opening surface side is fitted into the groove 52a formed on the end surface on the outer peripheral side of the outer ring 52 of the bearing body 5.

The sensor substrate 31 and the coil unit 34 are adjacently arranged on the inner side of the cover 4 along the circular ring of the attaching surface 41, and are fixed by screwing or the like.

The cover 4 is fitted into the groove 52a of the outer ring 52 of the bearing body 5 with the sensor substrate 31 and the coil unit 34 fixed on the attaching surface 41, so that the sensor unit 3 is housed between the cover 4 and the bearing body 5. It is to be noted that, as an attaching method of the cover 4, a method such as press fitting, caulking, or adhesion can be applied.

A plurality of rolling elements 53 intervene between the inner ring 51 and the outer ring 52 of the bearing body 5. The rolling elements 53 are preferably ceramic balls so as to prevent electric corrosion.

The inner ring 51 rolls with the outer ring 52 fixed, the tone ring 2 rotates together with the inner ring 51, and the tone ring 2 and the coil unit 34 rotate relatively, so that positions of the bumps and dents on the outer periphery of the tone ring 2 and the opposed coil unit 34 are changed. Thus, a distance between the coil unit 34 and the outer periphery of the tone ring 2 is changed periodically by the bumps and dents on the outer periphery of the tone ring 2, so that the magnetic flux density generated in each of the coils 33 is changed, and an alternating-current voltage is generated in each of the coils 33 with the change of the magnetic flux density. The generated alternating-current voltage is converted into a direct-current voltage, and the direct-current voltage is supplied to each part of the sensor unit 3 as operating power. It is to be noted that the case where power is generated by an electromagnetic induction method is described here, but power may be generated by an electrostatic induction method, and any means may be used as a power generation method.

In addition, the case where the outer ring 52 is fixed and the inner ring 51 is rotated is described here, but the present invention is not limited thereto, and can be applied even in the case where the inner ring 51 is fixed and the outer ring 52 is rotated.

Figure 2:
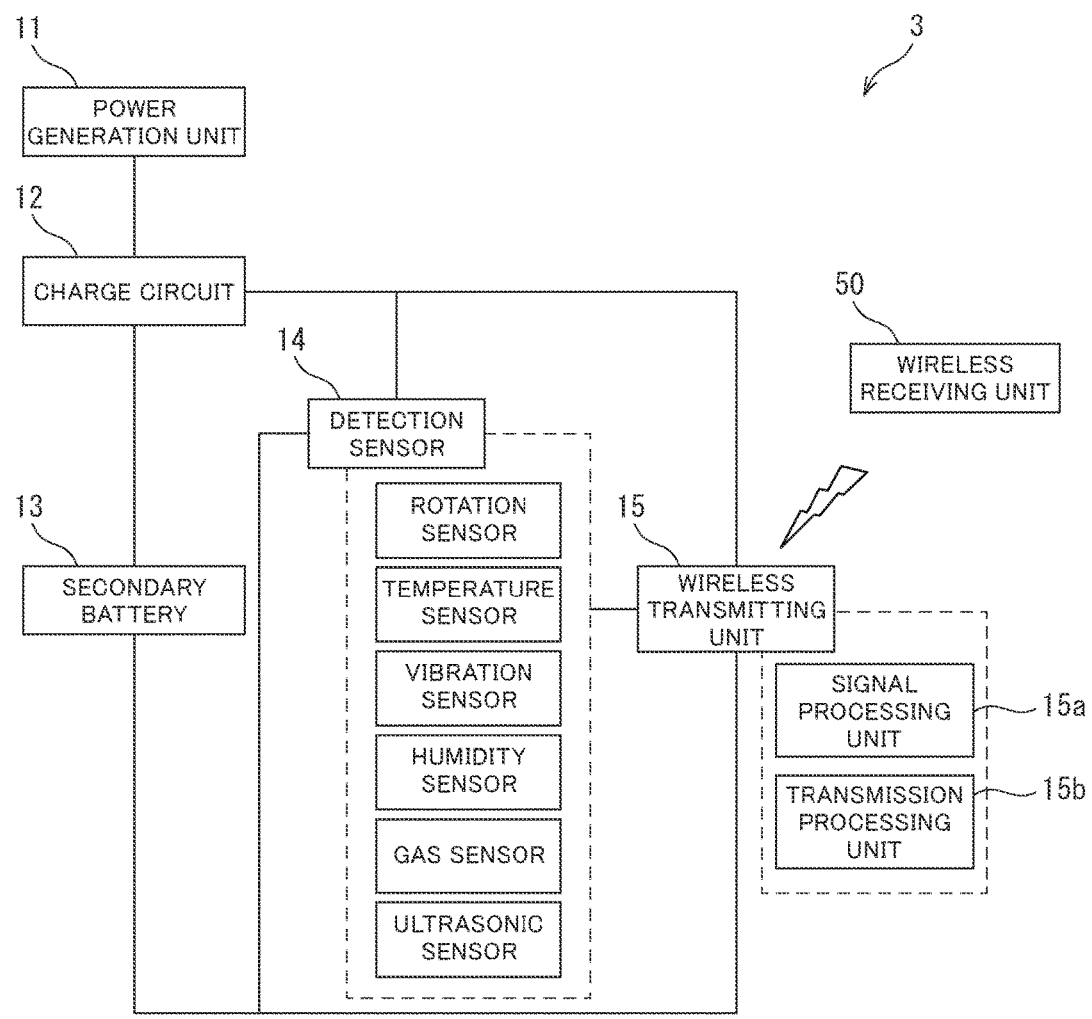
FIG. 2 is a block diagram illustrating one example of a sensor unit.

FIG. 2 is a block diagram illustrating one example of the sensor unit 3.

The sensor unit 3 includes a power generation unit 11, a charge circuit 12, a secondary battery 13, a detection sensor 14, and a wireless transmitting unit 15.

An alternating-current voltage generated in the power generation unit 11 is converted into a direct-current voltage by the charge circuit 12, the direct-current voltage is fed into the detection sensor 14 and the wireless transmitting unit 15, and a surplus is stored in the secondary battery 13. The detection sensor 14 and the wireless transmitting unit 15 operate by receiving power fed from the charge circuit 12 and the secondary battery 13. The tone ring 2 and the coils 33 in FIG. 1A and FIG. 1B correspond to the power generation unit 11.

The detection sensor 14 includes any one of or a plurality of sensors among various sensors that detect physical quantities regarding the bearing body 5, which influence on the operation, performance, and the like of the bearing body 5, such as a rotation sensor that detects the rotational speed of the bearing body 5, a temperature sensor that detects the ambient temperature of the bearing body 5, a vibration sensor that detects the vibration of the bearing body 5, a humidity sensor that detects the ambient humidity of the bearing body 5, a gas sensor that detects gaseous hydrocarbon, hydrogen sulfide, ammonia, and the like generated with oxidative degradation of a lubricant of the bearing body 5, and an ultrasonic sensor that detects the frictional sound generated in the bearing body 5. The case where the detection sensor 14 includes one sensor is described here for simplification.

Detection information by the detection sensor 14 is transmitted by the wireless transmitting unit 15 via wireless communication, and is received by a wireless receiving unit 50 provided in a receiving-side device, for example.

The wireless transmitting unit 15 includes, for example, a signal processing unit 15a and a transmission processing unit 15b. The signal processing unit 15a compares a threshold value preset for each of various pieces of detection information and the detection information detected by the detection sensor 14.

The threshold value is a value set to be a value on the side of a normal value from a boundary value between the normal value that is a value of detection information when being determined to be normal and an abnormal value that is a value of detection information when being determined to be abnormal. In other words, the threshold value is a value that is not abnormal but from which the detection information is predicted to be likely to reach the abnormal value, and is a boundary value between a range that can be covered by detection information that is predicted to be likely to reach the abnormal value at a later time and a range that can be covered by detection information that is not predicted so. Here, a region that takes a value on the normal value side from the threshold value is assumed as a normal region, and a region that takes a value on the abnormal value side from the threshold value, including the threshold value, is assumed as an attention calling region.

When the detection information by the detection sensor 14 is a value in the normal region, the signal processing unit 15a transmits the detection information via the transmission processing unit 15b at a preset first transmission interval. In contrast, when the detection information by the detection sensor 14 is a value in the attention calling region, the signal processing unit 15a transmits the detection information via the transmission processing unit 15b at a second transmission interval whose period is shorter than the first transmission interval.

The first transmission interval and the second transmission interval may be set depending on the type or the like of the detection information. For example, in the case of the detection information in which an abnormality should be detected quickly and the abnormality should be addressed quickly, or in the case of the detection information having a property that the change rate of the detection information is relatively large, the second transmission interval may be set depending on a detection object of the detection sensor 14, which is, in this case, the bearing body 5, a device or a system in which the bearing body 5 is incorporated, and the physical quantity of the detection object so as to be a relatively-short transmission interval, for example. In addition, the second transmission interval may be a transmission interval shorter than the first transmission interval.

It is to be noted that, when the detection sensor 14 includes a plurality of sensors for which physical quantities of detection objects are different, detection information of the plurality of sensors as the detection sensor 14 may be collectively transmitted at one time as the detection information of the detection sensor 14, or each of various pieces of the detection information or a plurality of pieces of the detection information may be transmitted.

When each of various pieces of the detection information is transmitted, a threshold value is set for each of various pieces of the detection information, and the transmission interval may be changed for each piece of the detection information on the basis of a corresponding threshold value. In addition, when a plurality of pieces of the detection information is collectively transmitted, a threshold value is set for each of various pieces of the detection information, when any one of or a plurality of pieces of the detection information exceeds the threshold value or when a detection information evaluation value obtained by, for example, adding or multiplying detection information equivalent values that correspond to the plurality of pieces of the detection information exceeds the threshold value, the transmission interval may be changed according to the detection information, the detection information evaluation value, or the like, and the plurality of pieces of the detection information may be transmitted at the changed transmission interval.

It is to be noted that the setting method of the threshold value and the transmission interval, the changing method of the transmission interval, and the like when there is a plurality of pieces of the detection information to be transmitted are not limited to the above-described methods, and may be set on the basis of the types of various pieces of the detection information, the degree of urgency of handling when abnormalities occur in various pieces of the detection information, and the like.

In the bearing 1 with a wireless sensor having the foregoing configuration, when the detection information detected by the detection sensor 14 is a normal value, the wireless transmitting unit 15 transmits the detection information at the first transmission interval having a relatively-long transmission interval.

From this state, when an abnormality occurs in the bearing body 5, and the detection information of the detection sensor 14 is changed to a value of the attention calling region from that of the normal region, the wireless transmitting unit 15 transmits the detection information at the second transmission interval whose transmission interval is shorter than the first transmission interval.

The receiving-side device that acquires the detection information via the wireless receiving unit 50 acquires the detection information at the second transmission interval whose transmission interval is shorter, and thus, can grasp the changing situation of the detection information in more detail, and can grasp the state of the bearing body 5 in more detail. Thus, the abnormality of the detection information can be detected and addressed at an earlier stage, i.e. at an initial stage of the abnormality. Accordingly, the bearing body 5 can be prevented from operating in an abnormal state, and long-term stable usage can be achieved.

In addition, in the wireless transmitting unit 15, the boundary value between the range that can be covered by detection information that is determined to be likely to be abnormal and the range that can be covered by detection information that is normal is set as the threshold value, and the transmission interval of the detection information is set to be short at a stage before the detection information actually becomes an abnormal value. Thus, the receiving-side device can grasp the changing situation of the detection information in detail at the stage before the detection information actually becomes an abnormal value. Accordingly, the receiving-side device can grasp an abnormality of the detection information at an initial stage of the abnormality, and can address the abnormality of the detection information at a stage before the abnormality of the detection information further advances.

In addition, at this time, when the detection information of the detection sensor 14 is in the normal region, the wireless transmitting unit 15 transmits the detection information at the first transmission interval having a longer transmission interval. In other words, when the detection information of the detection sensor 14 is a normal value, the detection information is quite unlikely to be changed significantly toward an abnormal value before reaching next transmission timing of the detection information. Thus, when it is predicted that the detection information is not changed significantly toward the abnormal value even if the transmission interval of the detection information is relatively long, the transmission interval of the detection information is made longer, and thus, the reduction in power consumption and the like in the wireless transmitting unit 15 can be achieved. Furthermore, also in the receiving-side device of the detection information, the processing load for the received detection information can be reduced.

In particular, when the bearing 1 with a wireless sensor is applied to bearings used for machine tools, industrial machines, vehicles, and the like, the bearings move to generate vibration and generate heat by friction, and the vibration and the temperature affect the life of the bearings. Thus, in particular, for bearings attached to a part that is difficult to be checked, such as the inside of a device, a higher-level device needs to detect and monitor the ambient environment, such as vibration and a temperature.

As described above, the bearing 1 with a wireless sensor in the embodiment of the present invention can be used for a long time while ensuring safety. Thus, in particular, by applying the bearing 1 with a wireless sensor to bearings used for machine tools, industrial machines, vehicles, and the like, the bearings, the machine tools, the industrial machines, the vehicles, and the like can be used for a long time while ensuring reliability.

Figure 3:
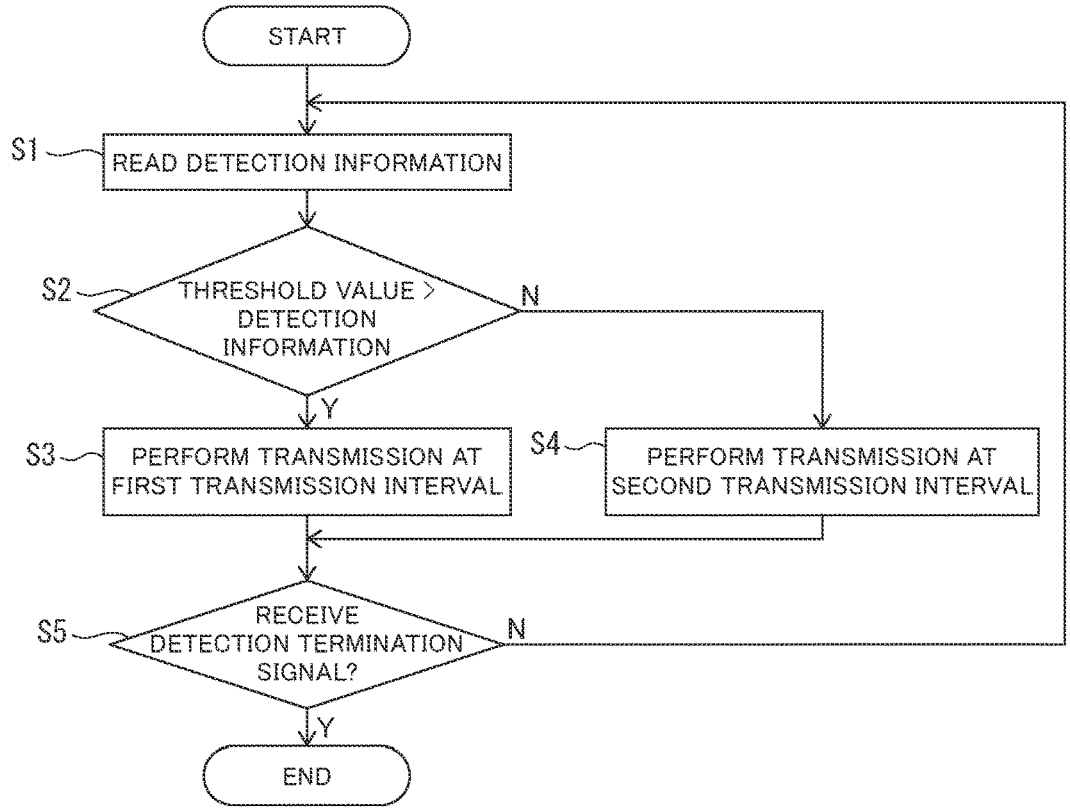
FIG. 3 is a flow chart illustrating one example of a processing procedure in a signal processing unit in a first embodiment.

FIG. 3 is a flow chart illustrating one example of a processing procedure in the signal processing unit 15*a*.

When receiving a start signal instructing start of detection operation by the detection sensor 14 from the receiving-side device of the detection information, such as a higher-level device, the signal processing unit 15*a* activates the detection sensor 14 at a preset regular time interval, and acquires various pieces of detection information, such as temperature (Step S1). Then, the acquired detection information and the threshold value are compared (Step S2).

When the detection information is smaller than the threshold value and is a value of the normal region, the process proceeds to Step S3, and the detection information is transmitted at the first transmission interval. In contrast, when the detection information is the threshold value or larger and is a value of the attention calling region, the process proceeds to Step S4, and the detection information is transmitted at the second transmission interval whose transmission interval is shorter than the first transmission interval.

The signal processing unit 15*a* performs the processing from Step S1 to S2, and Step S3 or Step S4 repeatedly until receiving a detection termination signal instructing termination of the detection operation from the receiving-side device of the detection information (Step S5).

It is to be noted that, when transmitting the detection information at the second transmission interval, in other words, when the detection information is a value of the attention calling region, an alarm signal indicating that the detection information is a value of the attention calling region may be transmitted together with the detection information.

Next, a second embodiment of the present invention will be described.

The second embodiment is the same as the above-described first embodiment except that the processing procedure in the wireless transmitting unit 15 is different.

More specifically, in the second embodiment, the signal processing unit 15a changes the transmission interval depending on a relation between a value of the detection information and a plurality of preset threshold values.

For example, the description will be performed by taking an internal temperature of the bearing body 5 as an example, as the detection information.

Figure 4:
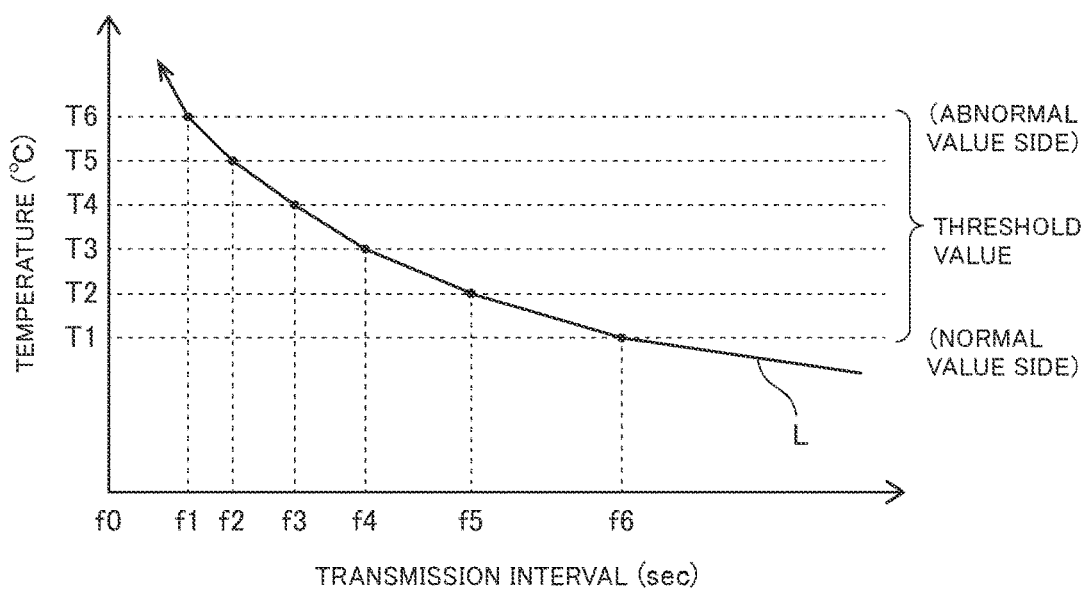
FIG. 4 is a characteristic diagram expressing a relation between a temperature as detection information and a transmission interval.

As illustrated in FIG. 4, a plurality of threshold values T1 to T6 are set as the detection information, i.e. the threshold values of the internal temperature, and the threshold values and the transmission intervals are associated with each other such that the higher the internal temperature is, in other words, the larger toward the abnormal value the internal temperature is, the shorter the transmission interval of the detection information is. In the case of FIG. 4, the transmission interval is set to f6 when the internal temperature is lower than T1, and the transmission interval is set to f5 when the internal temperature is T1 or higher and lower than T2. In addition, the transmission interval is set to f4 when the internal temperature is T2 or higher and lower than T3, the transmission interval is set to f3 when the internal temperature is T3 or higher and lower than T4, the transmission interval is set to f2 when the internal temperature is T4 or higher and lower than T5, the transmission interval is set to f1 when the internal temperature is T5 or higher and lower than T6, and the transmission interval is set to f0 when the internal temperature is T6 or higher. The transmission intervals satisfy a relation of f0<f1<f2<f3<f4<f5<f6, are set such that the higher the internal temperature is, in other words, the larger toward the abnormal value the internal temperature is, the shorter the transmission interval is, and furthermore, are set such that the higher the internal temperature is, the larger the amount of change of the transmission interval with respect to the amount of change of the internal temperature is. In addition, the minimum threshold value (T1 in the case of FIG. 4) is a value lower than the internal temperature (detection information) at which it can be considered that an abnormality has actually occurred, and is set to a value at which an abnormality is predicted to be likely to occur.

When the internal temperature detected by the detection sensor 14 is a normal value and is lower than the threshold value T1, according to the characteristic diagram of FIG. 4, the transmission interval is set to f6 that is relatively-long. When the internal temperature begins to increase by any cause, with the increasing internal temperature, the transmission interval is changed from f6 to f5, and the transmission interval is sequentially changed at timing to pass each of the threshold values T1 to T6, so that the detection information is transmitted to the receiving-side device at a shorter transmission interval.

Thus, the receiving-side device can grasp the changing situation of the internal temperature in more detail as the internal temperature becomes higher, that is, as the internal temperature becomes larger toward the abnormal value, and can recognize the changing state of the internal temperature at a shorter period as the internal temperature increases and attention needs to be paid to the change of the internal temperature more carefully. Thus, the receiving-side device can handle the change of the internal temperature more appropriately at an earlier stage. In addition, also in this case, the transmission interval of the detection information is long when the internal temperature is a normal value, and thus, unnecessary detection information is prevented from being transmitted to the receiving-side device, and the reduction in load of the receiving-side device can be achieved.

In addition, in the wireless transmitting unit 15, a value that is an internal temperature lower than the internal temperature (detection information) at which it can be considered that an abnormality has actually occurred, and at which an abnormality is predicted to be likely to occur is set as the minimum threshold value T1, and the transmission interval is made shorter at a stage before an abnormality actually occurs. Thus, the receiving-side device can grasp the changing situation of the detection information at the stage before an abnormality occurs, that is, can detect the presence or absence of an abnormality of the detection information at an earlier stage.

In addition, when the detection information is a value corresponding to the threshold value T1 at which it cannot be considered that an abnormality occurs but it is considered that an abnormality is likely to occur, the transmission interval is f5, and the transmission interval is shorter than the transmission interval f6 at which it is considered that the detection information is normal. Thus, for example, when the detection information has exceeded the threshold value T1 due to a temporary change from a normal value, the transmission interval is changed from f6 to f5 whose transmission interval is shorter, but the amount of change of the transmission interval is relatively small, and thus, the amount of increase in load in the receiving-side device due to the change is small. Thus, when the detection information is not an abnormal value but is a value at which it is considered that an abnormality is likely to occur, the increase in load in the receiving-side device is suppressed, and when an abnormality has actually occurred, the abnormality can be addressed quickly.

In addition, also in this case, when the detection information is the threshold value T1 or larger, a threshold value or larger at which it can be considered to be obviously abnormal, or the like, an alarm signal indicating that the detection information is an abnormal value may be transmitted together with the detection information.

Figure 5:
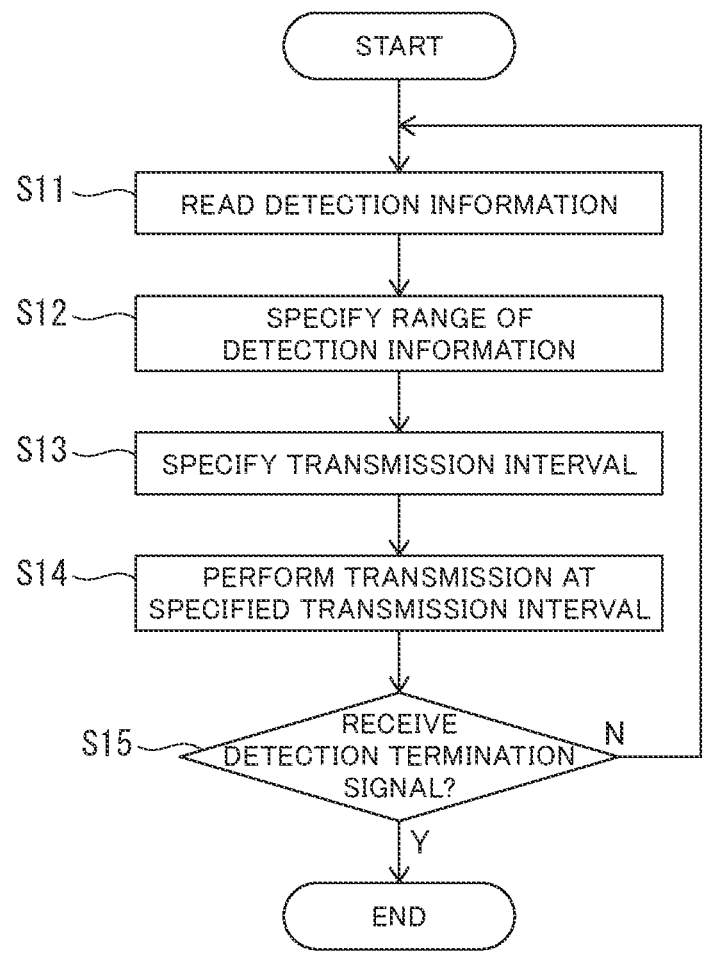
FIG. 5 is a flow chart illustrating one example of a processing procedure in the signal processing unit in a second embodiment.

FIG. 5 is a flow chart illustrating one example of a processing procedure in the signal processing unit 15a in the second embodiment.

When receiving a start signal instructing start of detection operation by the detection sensor 14 from a higher-level device, for example, the signal processing unit 15a activates the detection sensor 14 at a preset regular time interval, and acquires various pieces of detection information, such as temperature, from the detection sensor 14 (Step S11). Then, the signal processing unit 15a compares the acquired detection information of the detection sensor 14 with the threshold values sequentially, and determines which temperature range partitioned by the threshold values T1 to T6 the detection information exists. In other words, the signal processing unit 15a determines that the detection information is smaller than T1, or T6 or larger, or determines between which threshold values among T1 to T6 the detection information exists (Step S12).

Then, a transmission interval corresponding to the detected temperature range is specified from the characteristic line of FIG. 4 (Step S13), and the detection information is transmitted at the specified transmission interval (Step S14). In other words, the detection information is transmitted after a lapse of the specified transmission interval from previous transmission of the detection information.

The processing from Step S11 to Step S14 is performed repeatedly until receiving a detection termination signal instructing termination of the detection operation from the receiving-side device of the detection information (Step S15).

It is to be noted that the case where the transmission interval is changed in stages according to the temperature is described in the above-described second embodiment, but the present invention is not limited thereto.

For example, as illustrated by the characteristic line L in FIG. 4, the transmission interval may be changed continuously in accordance with the change of the temperature, and furthermore, settings may be configured such that the amount of change of the transmission interval becomes larger as the temperature becomes higher.

In this case, for example, a temperature-transmission interval function expressing a relation between a temperature and a transmission interval, which represents the characteristic line L illustrated in FIG. 4, is stored in the wireless transmitting unit 15, on the basis of the detection information from the detection sensor 14, a corresponding transmission interval is specified according to the temperature-transmission interval function, and the detection information is transmitted at the specified transmission interval.

It is to be noted that the bearing 1 with a wireless sensor in the embodiment of the present invention can be applied to various bearings, such as bearings for industrial machines and bearings for vehicles, and can also be applied to management devices, monitoring devices, and the like, each of which including a bearing-side device having a bearing and a receiving-side device that receives the detection information of the detection sensor 14 from the bearing-side device.

In addition, the case where power is generated by using the tone ring 2 and the coils 33 is described in the above-described embodiments, but the power generation method is not limited thereto, and another power generation method may be used.

While the present invention has been described with reference to the specific embodiments, the description of the embodiments is not intended to limit the invention. It is obvious that those skilled in the art will appreciate other embodiments of the present invention together with various variations of the disclosed embodiments with reference to the description of the present invention. Therefore, the claims shall be interpreted to cover these variations or embodiments contained in the technical scope and gist of the present invention.

REFERENCE SIGNS LIST 1 bearing with wireless sensor
2 tone ring
3 sensor unit
33 coil
4 cover
5 bearing body
11 power generation unit
12 charge circuit
13 secondary battery
14 detection sensor
15 wireless transmitting unit
15a signal processing unit
15b transmission processing unit
51 inner ring
52 outer ring
51a, 52a groove
53 rolling element

The invention claimed is:

1. A bearing with a wireless sensor, the bearing comprising:
   a bearing body;
   a plurality of detection sensors that are provided in the bearing body and configured to detect a physical quantity regarding the bearing body;
   a transmission processing unit that is provided in the bearing body and configured to transmit a plurality of pieces of detection information obtained by the plurality of detection sensors, respectively, via wireless communication;
   a signal processing unit that is provided in the bearing body and configured to control transmission intervals of the plurality of pieces of detection information by the transmission processing unit, and to shorten the transmission intervals as the detection information has a larger value in an abnormal value direction, the abnormal value direction being a direction of the detection information from a normal value side toward an abnormal value side; and
   a power generation unit that is provided in the bearing body and configured to provide electric power to the plurality of detection sensors, the transmission processing unit, and the signal processing unit,
   wherein, a threshold value is set for each of the plurality of pieces of detection information on the normal value side from a boundary value that is set between a normal value of the each of the plurality of pieces of detection information and an abnormal value of the each of the plurality of pieces of detection information, and
   the signal processing unit is configure to shorten the transmission intervals for all of the plurality of pieces of the detection information when at least one of the plurality of pieces of the detection information has a value on the abnormal value side from the threshold value, compared to when all of the plurality of pieces of the detection information have values on the normal value side from the threshold value.

2. The bearing with a wireless sensor according to claim 1, wherein
   the signal processing unit is configured to make an amount of change of the transmission interval with respect to an amount of change of the detection information larger as the detection information is larger in the abnormal value direction.

3. The bearing with a wireless sensor according to claim 1, wherein
   the signal processing unit is configured to make the transmission interval shorter in stages as the detection information proceeds toward the abnormal value direction.

4. The bearing with a wireless sensor according to claim 1, wherein
   the signal processing unit is configured to make the transmission interval shorter continuously as the detection information proceeds toward the abnormal value direction.

5. The bearing with a wireless sensor according to claim 1, wherein
the detection sensor detects any one of or a plurality of vibration, temperature, humidity, and a rotational speed.

6. The bearing with a wireless sensor according to claim 1, wherein
the detection sensor includes any one of an ultrasonic sensor and a gas sensor.

7. The bearing with a wireless sensor according to claim 1, wherein
the bearing body is a rolling bearing.

8. The bearing with a wireless sensor according to claim 1, wherein
the bearing body is a sliding bearing.

9. A bearing with a wireless sensor, the bearing comprising:
a bearing body;
a detection sensor that is provided in the bearing body and configured to detect a physical quantity regarding the bearing body;
a transmission processing unit that is provided in the bearing body and configured to transmit detection information by the detection sensor via wireless communication;
a signal processing unit that is provided in the bearing body and configured to control a transmission interval of the detection information by the transmission processing unit, and to make the transmission interval shorter as the detection information has a larger value in an abnormal value direction, the abnormal value direction being a direction of the detection information from a normal value side toward an abnormal value side; and
a power generation unit that is provided in the bearing body and configured to provide electric power to the detection sensor, the transmission processing unit, and the signal processing unit,
wherein, a threshold value is set on the normal value side from a boundary value set between a normal value of the detection information and an abnormal value of the detection information, and
the signal processing unit configured to make the transmission interval when the detection information has a value on the abnormal value side from the threshold value shorter than the transmission interval when the detection information has a value on the normal value side from the threshold value, and to make the transmission interval when the detection information has a first value on the normal value side from the threshold value shorter than the transmission interval when the detection information has a second value on the normal value side from the threshold value, a difference between the first value and the threshold value being smaller than a difference between the second value and the threshold value.

10. A bearing with a wireless sensor, the bearing comprising:
a bearing body;
a detection sensor that is provided in the bearing body and configured to detect a physical quantity regarding the bearing body;
a transmission processing unit that is provided in the bearing body and configured to transmit detection information by the detection sensor via wireless communication;
a signal processing unit that is provided in the bearing body and configured to control a transmission interval of the detection information by the transmission processing unit, and to make the transmission interval shorter as the detection information has a larger value in an abnormal value direction, the abnormal value direction being a direction of the detection information from a normal value side toward an abnormal value side; and
a power generation unit that is provided in the bearing body and configured to provide electric power to the detection sensor, the transmission processing unit, and the signal processing unit,
wherein, a threshold value is set on the normal value side from a boundary value set between a normal value of the detection information and an abnormal value of the detection information, and
the signal processing unit is configured to make the transmission interval when the detection information has a value on the abnormal value side from the threshold value shorter than the transmission interval when the detection information has a value on the normal value side from the threshold value, and to make the transmission interval shorter when the detection information has a first value on the abnormal value side from the threshold value shorter than the transmission interval when the detection information has a second value on the abnormal value side from the threshold value, a difference between the first value and the threshold value being larger than a difference between the second value and the threshold value.

* * * * *